United States Patent
Rosenberg et al.

(10) Patent No.: US 11,823,697 B2
(45) Date of Patent: Nov. 21, 2023

(54) IMPROVING SPEECH RECOGNITION WITH SPEECH SYNTHESIS-BASED MODEL ADAPATION

(71) Applicant: Google LLC, Mountain View, CA (US)

(72) Inventors: Andrew Rosenberg, Brooklyn, NY (US); Bhuvana Ramabhadran, Mt. Kisco, NY (US)

(73) Assignee: Google LLC, Mountain View, CA (US)

( * ) Notice: Subject to any disclaimer, the term of this patent is extended or adjusted under 35 U.S.C. 154(b) by 166 days.

(21) Appl. No.: 17/445,537

(22) Filed: Aug. 20, 2021

(65) Prior Publication Data

US 2023/0058447 A1    Feb. 23, 2023

(51) Int. Cl.
*G10L 15/26*    (2006.01)
*G10L 21/007*    (2013.01)
*G06N 3/08*    (2023.01)
*G10L 25/30*    (2013.01)

(52) U.S. Cl.
CPC .............. *G10L 21/007* (2013.01); *G06N 3/08* (2013.01); *G10L 15/26* (2013.01); *G10L 25/30* (2013.01)

(58) Field of Classification Search
CPC ........ G10L 21/007; G10L 15/26; G10L 25/30
USPC ....................................................... 704/200
See application file for complete search history.

(56) References Cited

U.S. PATENT DOCUMENTS

| | | | |
|---|---|---|---|
| 2015/0025664 A1* | 1/2015 | Cory | G10L 19/008 700/94 |
| 2021/0104223 A1 | 4/2021 | Beaufays et al. | |
| 2021/0118442 A1* | 4/2021 | Poddar | H04L 51/52 |
| 2021/0304769 A1* | 9/2021 | Ye | G10L 15/16 |

OTHER PUBLICATIONS

A. Rosenberg et al., "Speech Recognition with Augmented Synthesized Speech," 2019 IEEE Automatic Speech Recognition and Understanding Workshop (ASRU), Singapore, 2019, pp. 996-1002, doi: 10.1109/ASRU46091.2019.9003990. (Year: 2019).*

D. O'Shaughnessy, "Interacting with computers by voice: automatic speech recognition and synthesis," in Proceedings of the IEEE, vol. 91, No. 9, pp. 1272-1305, Sep. 2003, doi: 10.1109/JPROC.2003.817117. (Year: 2003).*

A. Rosenberg et al., "Speech Recognition with Augmented Synthesized Speech," 2019 IEEE Automatic Speech Recognition and Understanding Workshop (ASRU), Singapore, 2019, pp. 996-1002, doi: 10.1109/ASRU46091.2019.9003990. (Year: 2019) (Year: 2019).*

(Continued)

*Primary Examiner* — Bharatkumar S Shah
(74) *Attorney, Agent, or Firm* — Honigman LLP; Brett A. Krueger; Grant J. Griffith

(57) ABSTRACT

A method for training a speech recognition model includes obtaining sample utterances of synthesized speech in a target domain, obtaining transcribed utterances of non-synthetic speech in the target domain, and pre-training the speech recognition model on the sample utterances of synthesized speech in the target domain to attain an initial state for warm-start training. After pre-training the speech recognition model, the method also includes warm-start training the speech recognition model on the transcribed utterances of non-synthetic speech in the target domain to teach the speech recognition model to learn to recognize real/human speech in the target domain.

24 Claims, 6 Drawing Sheets

(56) References Cited

OTHER PUBLICATIONS

D.O'Shaughnessy, "Interacting with computers by voice: automatic speech recognition and synthesis," in Proceedings of the IEEE, vol. 91, No. 9, pp. 1272-1305, Sep. 2003, doi: 10.1109/JPROC.2003. 817117. (Year: 2003) (Year: 2003).*

International Search Report and Written Opinion relating to Application No. PCT/US2022/073977, dated Oct. 17, 2022.

Zhiyun Fan et al: "Unsupervised pre-training for sequence to sequence speech recognition", arxiv.org <http://arxiv.org>, Cornell University Library, 201 Olin Library Cornell University Ithaca, NY 14853, Oct. 28, 2019 (Oct. 28, 2019), XP081570270, p. 1, paragraph 1.—p. 3, paragraph 4.2; figure 1.

Fan Zhiyun et al: "Two-Stage Pre-Training for Sequence to Sequence Speech Recognition", 2021 International Joint Conference on Neural Networks (IJCNN), IEEE, Jul. 18, 2021 (Jul. 18, 2021), pp. 1-6, XP033975196, DOI: 10.1109/IJCNN52387.2021.9534170 [retrieved on Sep. 8, 2021] abstract p. 2, paragraph III.—p. 4, paragraph IV. A. p. 1, paragraph I.

Amin Fazel et al: "SynthASR: Unlocking Synthetic Data for Speech Recognition", ARXrV.org <http://ARXrV.org>, Cornell University Library, 201 Olin Library Cornell University Ithaca, NY 14853, Jun. 14, 2021 (Jun. 14, 2021), XP081989583, abstract p. 2, paragraph 3.—p. 3, paragraph 3.5; figures 1,2.

SYNTH2AUG: Cross-domain Speaker Recognition With TTS Synthesized, <https://arxiv.org/pdf/2011.11818.pdf>, Google LLC | DeepMind, published Nov. 24, 2020.

* cited by examiner

IMPROVING SPEECH RECOGNITION WITH SPEECH SYNTHESIS-BASED MODEL ADAPATION

TECHNICAL FIELD

This disclosure relates to improving speech recognition with speech synthesis-based model adaption.

BACKGROUND

Automatic speech recognition (ASR), the process of taking an audio input and transcribing it into text, has greatly been an important technology that is used in mobile devices and other devices. In general, automatic speech recognition attempts to provide accurate transcriptions of what a person has said by taking an audio input (e.g., speech utterance) and transcribing the audio input into text. Modern ASR models continue to improve in both accuracy (e.g. a low word error rate (WER)) and latency (e.g., delay between the user speaking and the transcription) based on the ongoing development of deep neural networks. However, one challenge in developing deep learning-based ASR models is that parameters of the ASR models tend to over fit the training data, thereby resulting in the ASR models having difficulties generalizing unseen data when the training data is not extensive enough. As a result, training ASR models on larger training datasets improves the accuracy of the ASR model. Synthesized speech and/or data-augmented speech can be incorporated to increase the volume of training data used to train the ASR models.

SUMMARY

One aspect of the disclosure provides a computer-implemented method that when executed on data processing hardware causes the data processing hardware to perform operations. The operations include obtaining sample utterances of synthesized speech in a target domain and obtaining transcribed utterances of non-synthetic speech in the target domain. The operations also include pre-training a speech recognition model on the sample utterances of synthesized speech in the target domain to attain an initial state for warm-start training. After pre-training the speech recognition model, the operations also include warm-start training the speech recognition model on the transcribed utterances of non-synthetic speech in the target domain to teach the speech recognition model to learn to recognize real/human speech in the target domain.

Implementations of the disclosure may include one or more of the following optional features. In some implementations, obtaining the sample utterances of synthesized speech in the target domain includes generating, using a text-to-speech system, each sample utterance of synthesized speech based on a corresponding transcript of the utterance received as input at the TTS system. The corresponding transcript may be sampled from a language model. TTS system may be trained on transcribed audio samples in the target domain and/or trained on out-of-domain audio samples distinct from the target domain. The TTS system may be further configured to at least one of vary voice characteristics across the utterances of synthesized speech or vary prosodic/style qualities across the utterances of synthesized speech.

In some examples, the operations also include applying data augmentation to one or more of the sample utterances of synthesized speech. Here, the applied data augmentation may include at least one of adding noise, adding reverberation, or manipulating timing. The speech recognition model may include a frame-alignment-based transducer model such as a Recurrent Neural Network-Transducer (RNN-T) model. The speech recognition model may include an alignment-based encoder-decoder model.

Another aspect of the disclosure provides a system that includes data processing hardware and memory hardware in communication with the data processing hardware and storing instructions that when executed on the data processing hardware cause the data processing hardware to perform operations. The operations include obtaining sample utterances of synthesized speech in a target domain and obtaining transcribed utterances of non-synthetic speech in the target domain. The operations also include pre-training a speech recognition model on the sample utterances of synthesized speech in the target domain to attain an initial state for warm-start training. After pre-training the speech recognition model, the operations also include warm-start training the speech recognition model on the transcribed utterances of non-synthetic speech in the target domain to teach the speech recognition model to learn to recognize real/human speech in the target domain.

Implementations of the disclosure may include one or more of the following optional features. In some implementations, obtaining the sample utterances of synthesized speech in the target domain includes generating, using a text-to-speech system, each sample utterance of synthesized speech based on a corresponding transcript of the utterance received as input at the TTS system. The corresponding transcript may be sampled from a language model. TTS system may be trained on transcribed audio samples in the target domain and/or trained on out-of-domain audio samples distinct from the target domain. The TTS system may be further configured to at least one of vary voice characteristics across the utterances of synthesized speech or vary prosodic/style qualities across the utterances of synthesized speech.

In some examples, the operations also include applying data augmentation to one or more of the sample utterances of synthesized speech. Here, the applied data augmentation may include at least one of adding noise, adding reverberation, or manipulating timing. The speech recognition model may include a frame-alignment-based transducer model such as a Recurrent Neural Network-Transducer (RNN-T) model. The speech recognition model may include an alignment-based encoder-decoder model.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
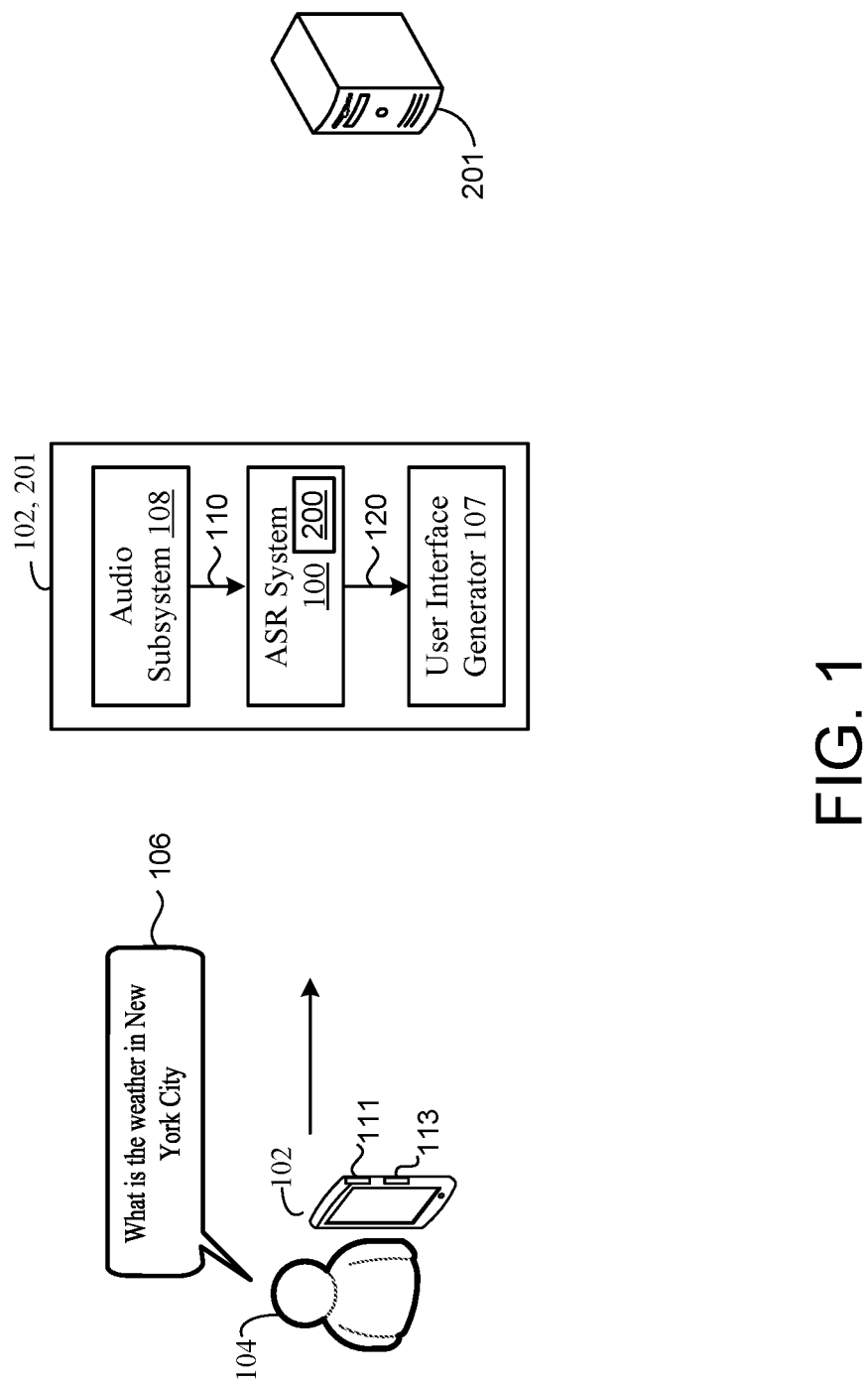
FIG. 1 is a schematic view of an example speech recognition system.

Automated speech recognition has made tremendous strides with the introduction of sequence to sequence (Seq2Seq) models that map from audio to character sequences. At the same time, text-to-speech (TTS) or speech syntheses systems have successfully applied Seq2Seq models to obtain state of the art natural, realistic sounding synthesized speech that can be indistinguishable to the human ear from human speech.

One challenge in developing deep learning-based ASR models is that parameters of the ASR models tend to over fit the training data, thereby resulting in the ASR models having difficulties generalizing unseen data when the training data is not extensive enough. Thus, training ASR models on larger training datasets improves the accuracy of the ASR model. For instance, the use of machine learning or other statistical methods can train ASR models on training data sets that include upwards of 10,000 hours of transcribed speech. Yet, performance of ASR models suffers when a domain associated with the training data is distinct from a domain at which the ASR model will be deployed during inference. For example, training an ASR model on transcribed speech in a domain associated with video meetings would lose would be less effective in recognizing speech related to voice search queries, and vice versa.

Synthesized speech has the potential to drastically limit the amount of labeled human speech required to train ASR models, while also providing flexibility in moving the ASR model across different domains. Generally, the use of synthesized speech has shown to impact ASR training differently than human speech, despite instances of state of the art synthesized speech being indistinguishable from human speech. This gap between synthesized speech and human speech is attributed to mismatches in the synthesized speech data from the human speech data that arise from the difficult one-to-many mapping problem that TTS systems are trying to solve. Namely, while the aggregate quality of available synthesized speech is very high, the synthesized speech exhibits much less variation than human speech, as well as minimal speech disfluencies. As a result, training ASR models exclusively on synthesized speech data presents a difficulty for generalizing real speech utterances during inference Implementations herein are directed toward using synthesized speech for training ASR models to recognize speech in a target domain to maintain accuracy of the ASR models when large amounts of transcribed speech (e.g., non-synthetic speech) in the target domain for training the ASR models is not available or less prevalent. More specifically, implementations herein are directed toward using synthesized speech in the target domain for pre-training the ASR model to achieve a pre-calculated, informative state, and then warm-start training the ASR model from the pre-calculated, informative state using available transcribed non-synthetic speech in the target domain. Additional implementations include applying data augmentation techniques such as synthesizing diverse realizations of training utterances by varying synthesized speaker characteristics in order to promote robustness to speaker differences. The techniques described herein are especially useful when relatively little transcribed human speech in the target domain is available.

FIG. 1 illustrates an automated speech recognition (ASR) system 100 implementing an ASR model 200 that resides on a user device 102 of a user 104 and/or on a remote computing device 201 (e.g., one or more servers of a distributed system executing in a cloud-computing environment) in communication with the user device 102. Although the user device 102 is depicted as a mobile computing device (e.g., a smart phone), the user device 102 may correspond to any type of computing device such as, without limitation, a tablet device, a laptop/desktop computer, a wearable device, a digital assistant device, a smart speaker/display, a smart appliance, an automotive infotainment system, or an Internet-of-Things (IoT) device, and is equipped with data processing hardware 111 and memory hardware 113.

The user device 102 includes an audio subsystem 108 configured to receive an utterance 106 spoken by the user 104 (e.g., the user device 102 may include one or more microphones for recording the spoken utterance 106) and convert the utterance 106 into a corresponding digital format associated with input acoustic frames 110 capable of being processed by the ASR system 100. In the example shown, the user speaks a respective utterance 106 in a natural language of English for the phrase "What is the weather in New York City?" and the audio subsystem 108 converts the utterance 106 into corresponding acoustic frames 110 for input to the ASR system 100. Thereafter, the ASR model 200 receives, as input, the acoustic frames 110 corresponding to the utterance 106, and generates/predicts, as output, a corresponding transcription 120 (e.g., recognition result/hypothesis) of the utterance 106. In the example shown, the user device 102 and/or the remote computing device 201 also executes a user interface generator 107 configured to present a representation of the transcription 120 of the utterance 106 to the user 104 of the user device 102. In some configurations, the transcription 120 output from the ASR system 100 is processed, e.g., by a natural language understanding (NLU) module executing on the user device 102 or the remote computing device 201, to execute a user command. Additionally or alternatively, a text-to-speech system (e.g., executing on any combination of the user device 102 or the remote computing device 201) may convert the transcription into synthesized speech for audible output by another device. For instance, the original utterance 106 may correspond to a message the user 104 is sending to a friend in which the transcription 120 is converted to synthesized speech for audible output to the friend to listen to the message conveyed in the original utterance 106.

Figure 2A:
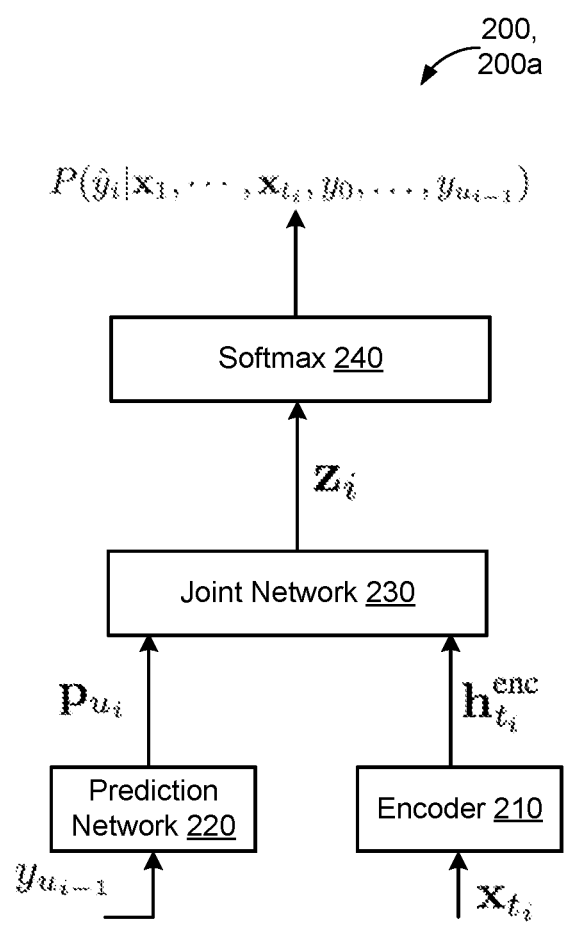
FIG. 2A is a schematic view of a Recurrent Neural Network-Transducer (RNN-T) model architecture.
Figure 2B:
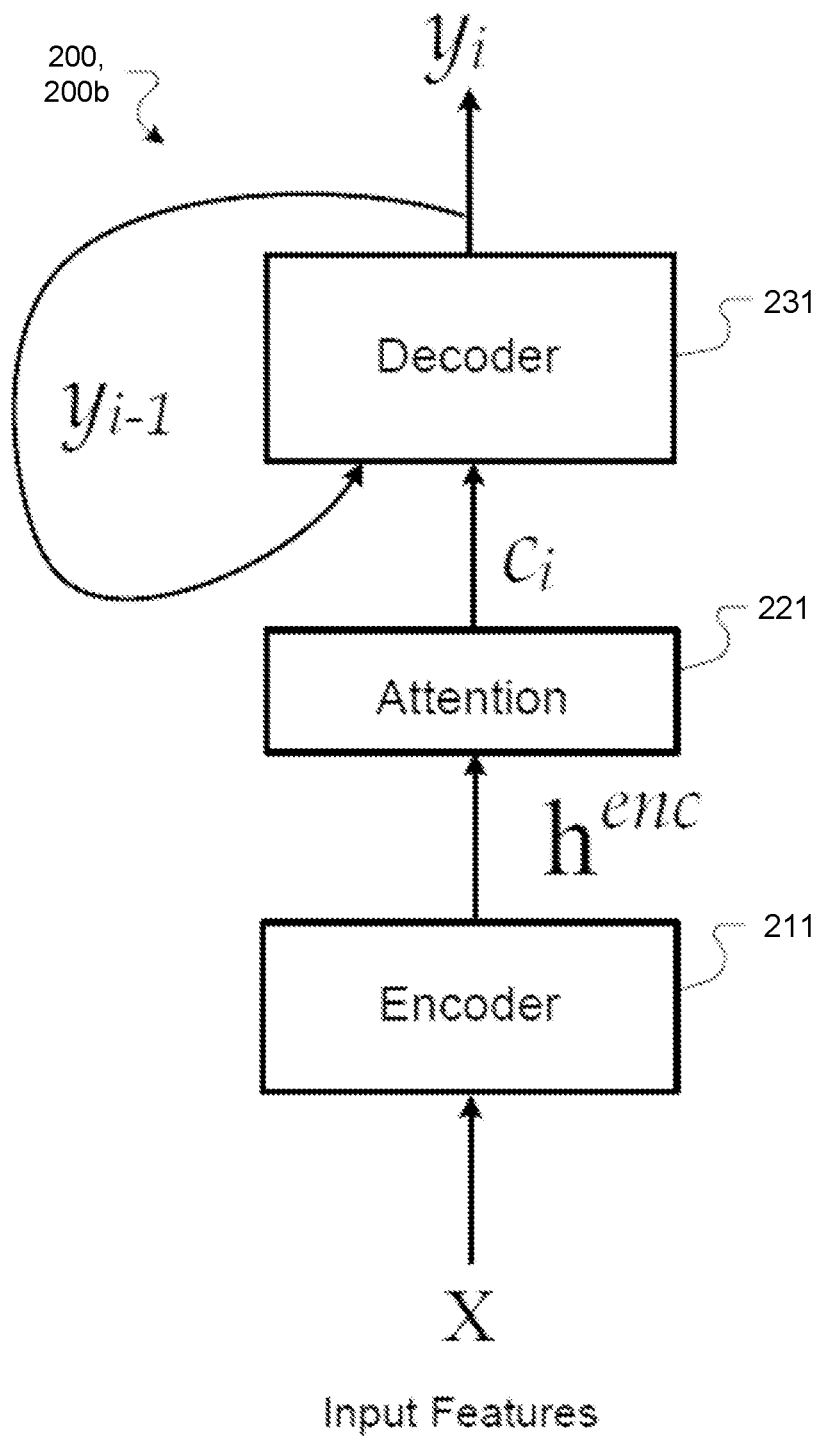
FIG. 2B is a schematic view of an Attention-Based Encoder-Decoder (AED) model architecture.

With reference to FIGS. 2A and 2B, the ASR model 200 may include an end-to-end (E2E) sequence-to-sequence model, such as a frame alignment-based transducer model 200a (FIG. 2A) or an attention-based encoder-decoder (AED) model 200b (FIG. 2B). The ASR model 200 may provide E2E speech recognition by integrating acoustic, pronunciation, and language models into a single neural network, and does not require a lexicon or a separate text normalization component. Various structures and optimization mechanisms can provide increased accuracy and reduced model training time. The ASR model 200

Referring to FIG. 2A, an example frame alignment-based transducer model 200a includes a Recurrent Neural Network-Transducer (RNN-T) model architecture which adheres to latency constrains associated with interactive applications. The use of the RNN-T model architecture is exemplary, and the frame alignment-based transducer model 200a may include other architectures such as transformer-transducer and conformer-transducer model architectures among others. The RNN-T model 200a provides a small computational footprint and utilizes less memory requirements than conventional ASR architectures, making the RNN-T model architecture suitable for performing speech recognition entirely on the user device 102 (e.g., no communication with a remote server is required). The RNN-T model 200a includes an encoder network 210, a prediction network 220, and a joint network 230. The encoder network 210, which is roughly analogous to an acoustic model (AM) in a traditional ASR system, includes a recurrent network of stacked Long Short-Term Memory (LSTM) layers. For instance, the encoder reads a sequence of d-dimensional feature vectors (e.g., acoustic frames 110 (FIG. 1)) $x=(x_1, x_2, \ldots, x_T)$, where $x_t \in \mathbb{R}^d$, and produces at each time step a higher-order feature representation. This higher-order feature representation is denoted as $h_1^{enc}, \ldots, h_T^{enc}$.

Similarly, the prediction network 220 is also an LSTM network, which, like a language model (LM), processes the sequence of non-blank symbols output by a final Softmax layer 240 so far, $y_0, \ldots, y_{ui-1}$, into a dense representation $p_{u_i}$. Finally, with the RNN-T model architecture, the representations produced by the encoder and prediction networks 210, 220 are combined by the joint network 230. The prediction network 220 may be replaced by an embedding look-up table to improve latency by outputting looked-up sparse embeddings in lieu of processing dense representations. The joint network then predicts $P(y_i|x_{t_i}, y_0, \ldots, y_{u_{i-1}})$, which is a distribution over the next output symbol. Stated differently, the joint network 230 generates, at each output step (e.g., time step), a probability distribution over possible speech recognition hypotheses. Here, the "possible speech recognition hypotheses" correspond to a set of output labels each representing a symbol/character in a specified natural language. For example, when the natural language is English, the set of output labels may include twenty-seven (27) symbols, e.g., one label for each of the 26-letters in the English alphabet and one label designating a space. Accordingly, the joint network 230 may output a set of values indicative of the likelihood of occurrence of each of a predetermined set of output labels. This set of values can be a vector and can indicate a probability distribution over the set of output labels. In some cases, the output labels are graphemes (e.g., individual characters, and potentially punctuation and other symbols), but the set of output labels is not so limited. For example, the set of output labels can include wordpieces and/or entire words, in addition to or instead of graphemes. The output distribution of the joint network 230 can include a posterior probability value for each of the different output labels. Thus, if there are 100 different output labels representing different graphemes or other symbols, the output $y_i$ of the joint network 230 can include 100 different probability values, one for each output label. The probability distribution can then be used to select and assign scores to candidate orthgraphic elements (e.g., graphemes, wordpieces, and/or words) in a beam search process (e.g., by the Softmax layer 240) for determining the transcription 120.

The Softmax layer 240 may employ any technique to select the output label/symbol with the highest probability in the distribution as the next output symbol predicted by the RNN-T model 200a at the corresponding output step. In this manner, the RNN-T model 200a does not make a conditional independence assumption, rather the prediction of each symbol is conditioned not only on the acoustics but also on the sequence of labels output so far. The RNN-T model 200a does assume an output symbol is independent of future acoustic frames 110, which allows the RNN-T model to be employed in a streaming fashion.

Figure 3:
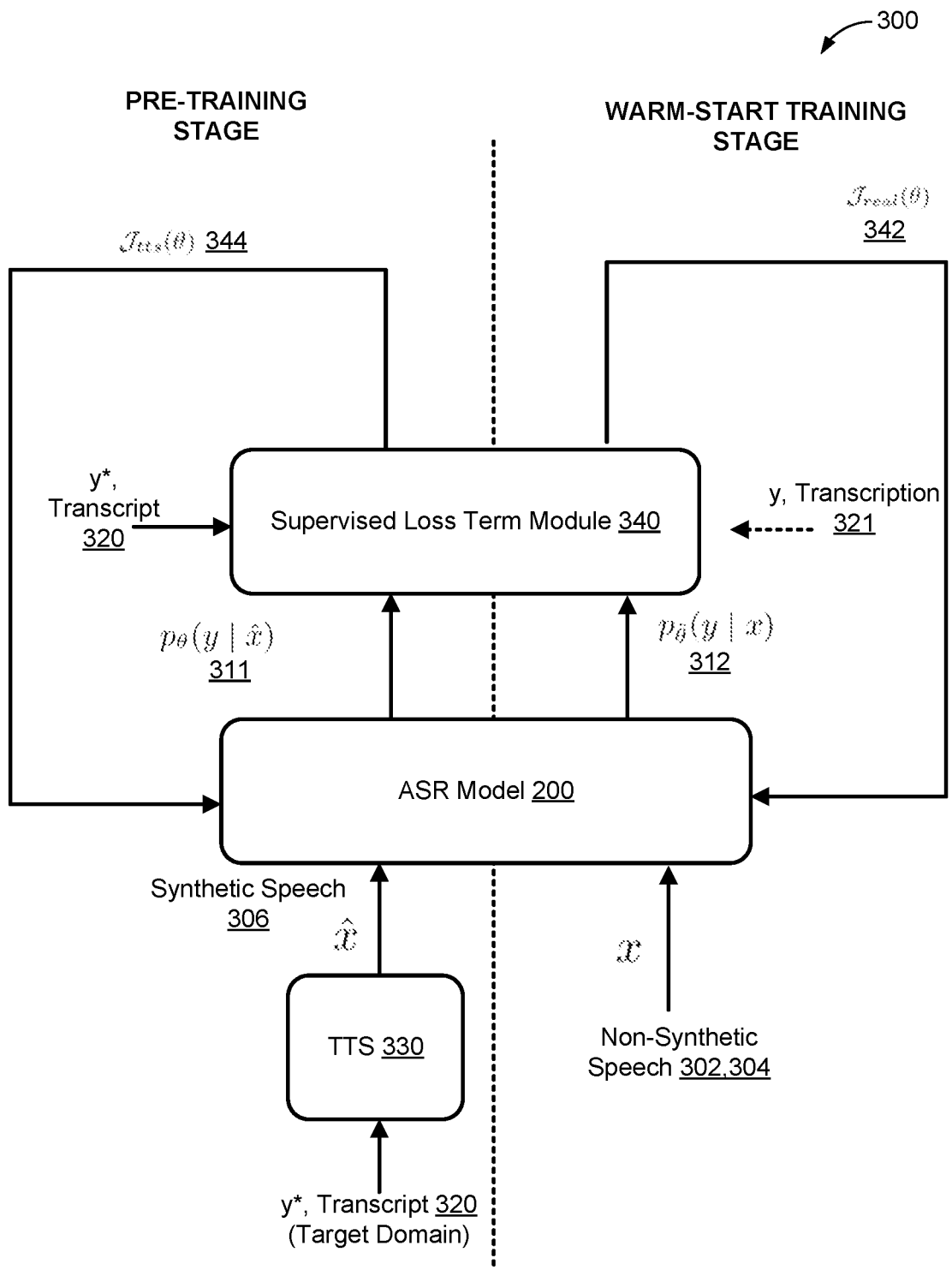
FIG. 3 is a schematic view of an example training process for promoting a speech recognition model of to learn consistent predictions on both non-synthetic speech and synthetic speech.

In some examples, the encoder network 210 of the RNN-T model 200a is made up of eight 2,048-dimensional LSTM layers, each followed by a 640-dimensional projection layer. The prediction network 220 may have two 2,048-dimensional LSTM layers, each of which is also followed by 640-dimensional projection layer. Finally, the joint network 230 may also have 640 hidden units. The softmax layer 240 may be composed of a unified word piece or grapheme set that is generated using all unique word pieces or graphemes in a plurality of training data sets 301 (FIG. 3).

Referring to FIG. 2B, an example AED model 200b associated with a Listen, Attend and Spell (LAS) model architecture that provides a single neural network including a listener encoder module 211 which is analogous to a conventional acoustic model, an attender module 221 that acts as an alignment model, and a decoder 231 that is analogous to the language model in a conventional system. Specifically, the listener encoder module 211 takes the input features (e.g., acoustic frames 110 (FIG. 1)), x, and maps them to a higher-level feature representation, $h^{enc}$. This process of generating an encoded feature representation, $h^{enc}$, can be done for each of the multiple input frames, representing different input time steps. These timesteps are denoted with a subscript u below. Thus, for a set of frames $\{f_1, f_2, f_3, \ldots, f_u\}$ there can be a corresponding set of encoded outputs $\{h_1, h_2, h_3, \ldots, h_u\}$.

The output of the listener encoder module 211 is passed to the attender module 221, which determines which encoder features in $h^{enc}$ should be attended to in order to predict the next output symbol, $y_i$, similar to a dynamic time warping (DTW) alignment module. In some examples, the attender module 221 is referred to herein as attender neural network or attender 221. The attender 221 can generate a context output $c_i$ for each of multiple output steps i. For each context output vector $c_i$, the attender 221 can compute attention based on the encodings for one or more input steps u, e.g., the encoding for the current input step as well as encodings for previous input steps. For example, the attender 221 can generate an attention context output $c_i$ over the set of all the encoder outputs of the utterance, e.g., the entire set $\{h_1, h_2, h_3, \ldots, h_u\}$. The attention context vector can be a vector representing a weighted summary of the current and previous encodings for frames (e.g., portions) of the utterance being recognized.

Finally, the output of the attender 221 is passed to the decoder 231, which takes the attention context (e.g., a context vector or attention distribution), $c_i$, output by the attender 221, as well as an embedding of the previous prediction, $y_{i-1}$, in order to produce a decoder output. The decoder output can be a probability distribution, $P(y_1|y_{i-1}, \ldots, y_0, x)$, over the current sub-word unit, $y_i$, given the previous units, $\{y_{i-1}, \ldots, y_0\}$, and input, x. Accordingly, the decoder 231 generates, at each output step, a probability distribution over possible speech recognition hypotheses. As with the RNN-T model 200a discussed above with reference to FIG. 2A, the "possible speech recognition hypotheses" correspond to a set of output symbols each representing a symbol/character in a specified natural language.

Although not illustrated, the ASR model 200 may include a softmax layer that receives output of the decoder 231. In some implementations, the softmax layer is separate from the decoder 231 and processes the output, $y_i$, from the decoder 231, and the output of the softmax layer is then used in a beam search process to select orthographic elements. In some implementations, the softmax layer is integrated with the decoder 231, so that the output $y_i$ of the decoder 231 represents the output of the softmax layer.

The decoder 231 and/or an associated softmax layer may be trained to output a set of values indicative of the likelihood of occurrence of each of a predetermined set of output labels. This set of values can be a vector and can indicate a probability distribution over the set of output labels. In some cases, the output labels are graphemes (e.g., individual characters, and potentially punctuation and other symbols), but the set of output labels are not so limited. For example, the set of output labels can include wordpieces and/or entire words, in addition to or instead of graphemes. The output distribution of the decoder 231 and/or the softmax layer can include a posterior probability value for each of the different output labels. Thus, if there are 100 different output labels representing different graphemes or other symbols, the output $y_i$ of the decoder or the output of a softmax layer that receives and processes the output $y_i$ can include 100 different probability values, one for each output label. The probability distribution can then be used to select and assign scores to candidate orthographic elements (e.g., graphemes, wordpieces, and/or words) in a beam search process for determining the transcription.

Referring to FIG. 3, an example training process 300 for initially pre-training the ASR model 200 from a random state to achieve a pre-calculated, informative state, and then warm-start training the model from the pre-calculated, informative state to teach the ASR model 200 to learn to accurately recognize speech in a target domain. As used herein, the target domain may refer to a type of speech the ASR model 200 will be recognizing during inference when employed. For example, the target domain may include meeting speech, voice search speech, sport broadcaster speech, newscaster speech, or navigation command speech to name a few. The target domain could also correspond to a particular language, such as a low resource language where transcribed human speech not readily available. In some examples, the ASR model 200 includes a multi-lingual ASR model. The training process 300 may execute on the remote computing device 201 of FIG. 1. For instance, the remote computing device 201 includes data processing hardware 510 (FIG. 5) and memory hardware 520 (FIG. 5) in communication with the data processing hardware and storing instructions that when executed on the data processing hardware 510 cause the data processing hardware 510 to perform operations of the training process 300.

In the example shown, the training process 300 includes a pre-training stage at which the ASR model 200 is pre-trained from a random state using sample utterances of synthetic speech 306 in a target domain to attain an initial state for warm-start training. This initial state is associated with a pre-calculated, informative state associated with the target domain. Thus, the pre-training stage uses the sample utterances of synthetic speech 306 to adapt the model for warm-start training.

A text-to-speech (TTS) system 330 may generate each sample utterance of synthetic speech 306 by performing TTS conversion on a corresponding transcript 320 of the utterance. Here, each transcript 320 corresponds to input text received by the TTS system 330 for conversion into synthesized audio that includes a corresponding utterance of synthetic speech 306 in the target domain. As such, each transcript 320 includes a sequence of text in the target domain. The sequence of text may include graphemes or phonemes. The transcripts 320 may be sampled from a language model trained to generate text utterances in the target domain. The TTS system 330 may apply a speaker embedding, z, when converting the transcript 320 to obtain synthesized speech with a specific speaking style and prosody associated with the speaker embedding. The TTS system 300 may apply a multitude of different speaker embeddings z each associated with different speaker characteristics of the resulting utterance of synthesized speech 306 being synthesized. Similarly, the TTS system 300 may vary the prosodic and other production qualities of the utterances being synthesized.

In some examples, the training process initially trains the TTS system 300 using available transcribed audio samples. In some examples, the available audio samples used to train the TTS system 300 include in-domain audio samples associated with the target domain. In other examples, the available audio samples used to train the TTS system 300 include out-of-domain audio samples that are distinct from the target domain. In these examples, the TTS system 300 is generating utterance of synthesized speech 306 in the target domain for input to the ASR model 200 during the pre-training stage despite the TTS system 300 being trained on transcribed out of domain audio samples. The TTS system 300 may be trained on a variation of in- and out-of-domain in some examples.

In some examples, the training process 300 applies data augmentation to at least one of the sample utterances of synthetic speech 306. The data augmentation may include, without limitation, adding noise, manipulating timing (e.g., stretching), or adding reverberation to the corresponding speech representation. Data augmentation may add different synthesized recording conditions to the synthesized speech 306.

During the pre-training stage, the ASR model 200 receives, as input, each utterance of synthetic speech ($\hat{x}$) 306 as a sequence of features/vectors (e.g., acoustic frames 110 of FIG. 1) and generates, as output, for each of the plurality of output steps, a first probability distribution 311 over possible synthetic speech recognition hypotheses (y) for the corresponding utterance synthetic speech ($\hat{x}$) 306. For simplicity, the term "synthetic speech recognition result 311" may be used to interchangeably refer to the first probability distribution 311 over possible synthetic speech recognition hypotheses (y) for the corresponding utterance of synthetic speech ($\hat{x}$) 306.

The training process 300 generates, as output at each of the plurality of output steps, a first supervised loss term for that includes a synthetic speech loss term ($\mathcal{J}_{tts}(\theta)$) 344 based on the transcript 320 and the first probability distribution 311 over possible synthetic speech recognition hypotheses (y) for the corresponding utterance of synthetic speech ($\hat{x}$) 306. Notably, the transcript 320 corresponding to the input text provided to the TTS system 330 for generating the corresponding utterance of synthetic speech 306 also serves as a ground-truth label/transcription. In the example shown, the training process 300 executes the supervised loss term module 340 configured to receive the transcript 320 as ground-truth and the first probability distribution 311 and output the synthetic speech loss term ($\mathcal{J}_{tts}(\theta)$) 344. The synthetic speech loss term ($\mathcal{J}_{tts}(\theta)$) 344 may be calculated by the following equation.

$$\mathcal{J}_{tts}(\theta) = \mathbb{E}_{x,y^* \in L}[p_\theta(y^*|\hat{x} \sim q(\hat{x}|y^*,z))] \quad (1)$$

Where y*, z denotes the synthetic speech representation ($\hat{x}$) 306 generated by the TTS module 330 based on the transcript (y*) and a speaker embedding (z).

The supervised loss term module 340 may provide the synthetic speech loss terms ($\mathcal{J}_{tts}(\theta)$) 344 back to the ASR model 200. For instance, the training process 300 may train the ASR model 200 using a stochastic optimization algorithm, such as stochastic gradient decent, to train the ASR model 200 through backpropagation. Here, the stochastic optimization algorithm uses the loss terms 344 to define respective loss functions (e.g., cross-entropy loss functions) based on a difference between actual outputs (e.g., synthetic speech recognition results 311) of the neural network and desired outputs (e.g., the ground-truth transcript 320 of the corresponding utterance). For instance, the loss function is computed for a batch of training examples, and then differentiated with respect to each weight in the ASR model 200.

Once the pre-training stage is complete and the initial state is attained, the training process 300 may execute the warm-start training stage to fine-tune the pre-trained model using available transcribed utterances of non-synthetic speech 304 in the target domain. Each utterance of non-synthetic speech 304 corresponds to real speech spoken by human. In some examples, the training process 300 applies data augmentation to at least one of the utterances of non-synthetic speech 304. The data augmentation may include, without limitation, adding noise, manipulating timing (e.g., stretching), or adding reverberation to the corresponding speech representation. Each transcribed utterance of non-synthetic speech 304 is associated with corresponding ground-truth transcription 321.

During the warm-start training stage, the ASR model 200 receives, as input, each utterance of non-synthetic speech (x) 304 as a sequence of features/vectors (e.g., acoustic frames 110 of FIG. 1) and generates, as output, for each of a plurality output steps, a second probability distribution 312 over possible non-synthetic speech recognition hypotheses (y) for the corresponding utterance of non-synthetic speech (x) 304. For simplicity, the term "non-synthetic speech recognition result 312" may be used to refer to the second probability distribution 312 over possible non-synthetic speech recognition hypotheses (y) for the corresponding utterance of non-synthetic speech (x) 304.

Thereafter, the training process 300 generates, for output by the ASR model 200 at each of the plurality of output steps, a second supervised loss term that includes a non-synthetic speech loss term ($\mathbb{E}_{real}(\theta)$) 342 based on a ground-truth transcription 321 and the non-synthetic speech recognition result 312 (y) for the corresponding non-synthetic speech representation (x) 304 of the corresponding utterance. In the example shown, the training process 300 executes the supervised loss term module 340 configured to receive the ground-truth transcription 321 and the second probability distribution 312 and output the non-synthetic speech loss term ($\mathbb{E}_{real}(\theta)$) 342. The non-synthetic speech loss term ($\mathbb{E}_{real}(\theta)$) 342 may be calculated by the following equation.

$$\mathbb{E}_{real}(\theta) = \mathbb{E}_{x,y^* \in L}[p_\theta(Y^*|X)] \quad (2)$$

The supervised loss term module 340 may provide the non-synthetic speech loss terms ($\mathbb{E}_{real}(\theta)$) 342 back to the ASR model 200. For instance, the training process 300 may train the ASR model 200 using a stochastic optimization algorithm, such as stochastic gradient decent, to train the ASR model 200 through backpropagation. Here, the stochastic optimization algorithm uses the loss terms 342 to define respective loss functions (e.g., cross-entropy loss functions) based on a difference between actual outputs (e.g., non-synthetic speech recognition results 312) of the neural network and desired outputs (e.g., the ground-truth transcription 321 of the corresponding utterance). For instance, the loss function is computed for a batch of training examples, and then differentiated with respect to each weight in the ASR model 200.

Advantageously, the ASR model 200 is able to initially pre-train on a potentially infinite number of utterances of synthetic speech in the target domain to adapt the ASR model 200 to learn to recognize real/human speech in the target domain. Notably, the techniques herein are particularly advantageous when available transcribed utterances of non-synthetic speech in the target domain is scarce. Accordingly, the ASR model 200 can be rapidly trained in a new target domain without having to rely on in-domain transcribed, non-synthetic speech since synthetic speech can be generated from unpaired text on the fly for training the ASR model 200 in the target domain. In one example use case, accuracy of the ASR model 200 can be drastically improved for recognizing speech in natural languages where transcribed non-synthetic speech is difficult to obtain by increasing the number of speech training examples from synthetic speech generated from unpaired text during the pre-training stage.

Figure 4:
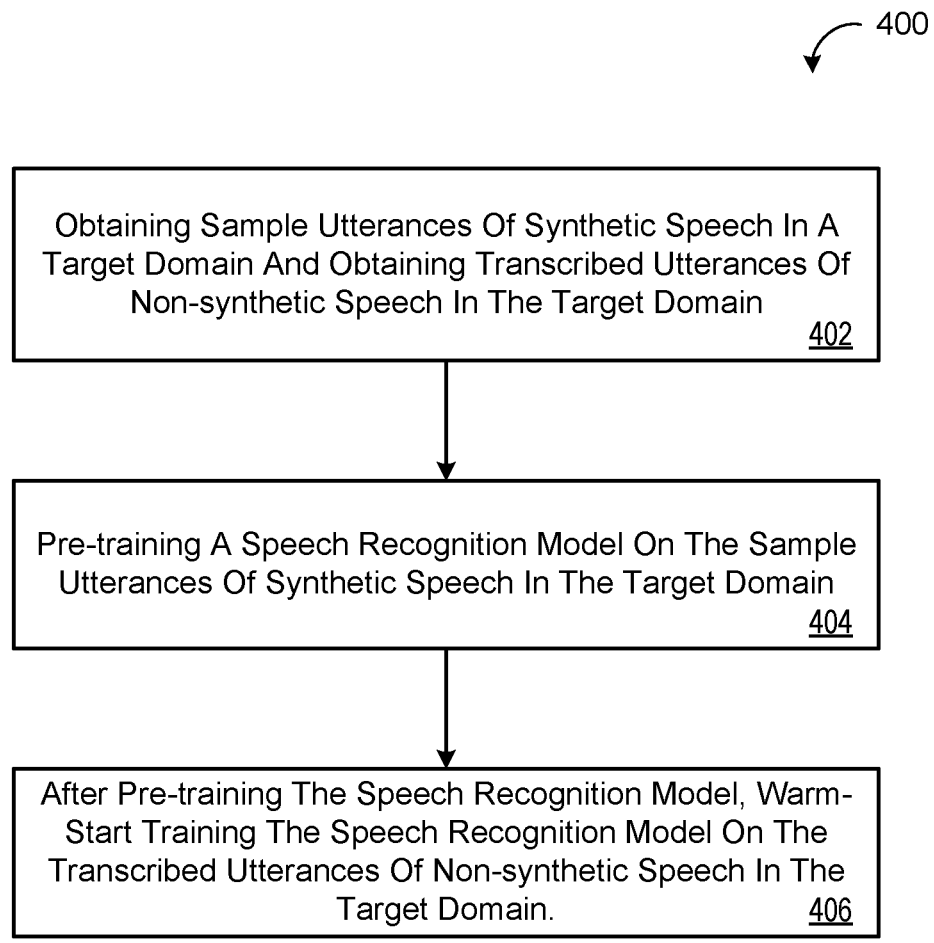
FIG. 4 is a flowchart of an example arrangement of operations for a method of training a speech recognition model.

FIG. 4 is a flowchart of an example arrangement of operations for a method 400 of training a speech recognition model 200. The ASR model 200 may include an attention-based encoder-decoder (AED) model 200b (FIG. 2B) or a frame alignment-based transducer model 200a (FIG. 2A). At operation 402, the method 400 includes obtaining sample utterances of synthesized speech 306 in a target domain and obtaining transcribed utterances of non-synthetic speech 304 in the target domain.

At operation 404, the method 400 includes pre-training the speech recognition model 200 on the sample utterances of synthesized speech 306 in the target domain to attain an initial state for warm-start training. After pre-training the speech recognition model 200, the method 400 also includes, at operation 406, warm-start training the speech recognition model 200 on the transcribed utterances of non-synthetic speech 304 in the target domain to teach the speech recognition model 200 to learn to recognize real/human speech in the target domain A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Figure 5:
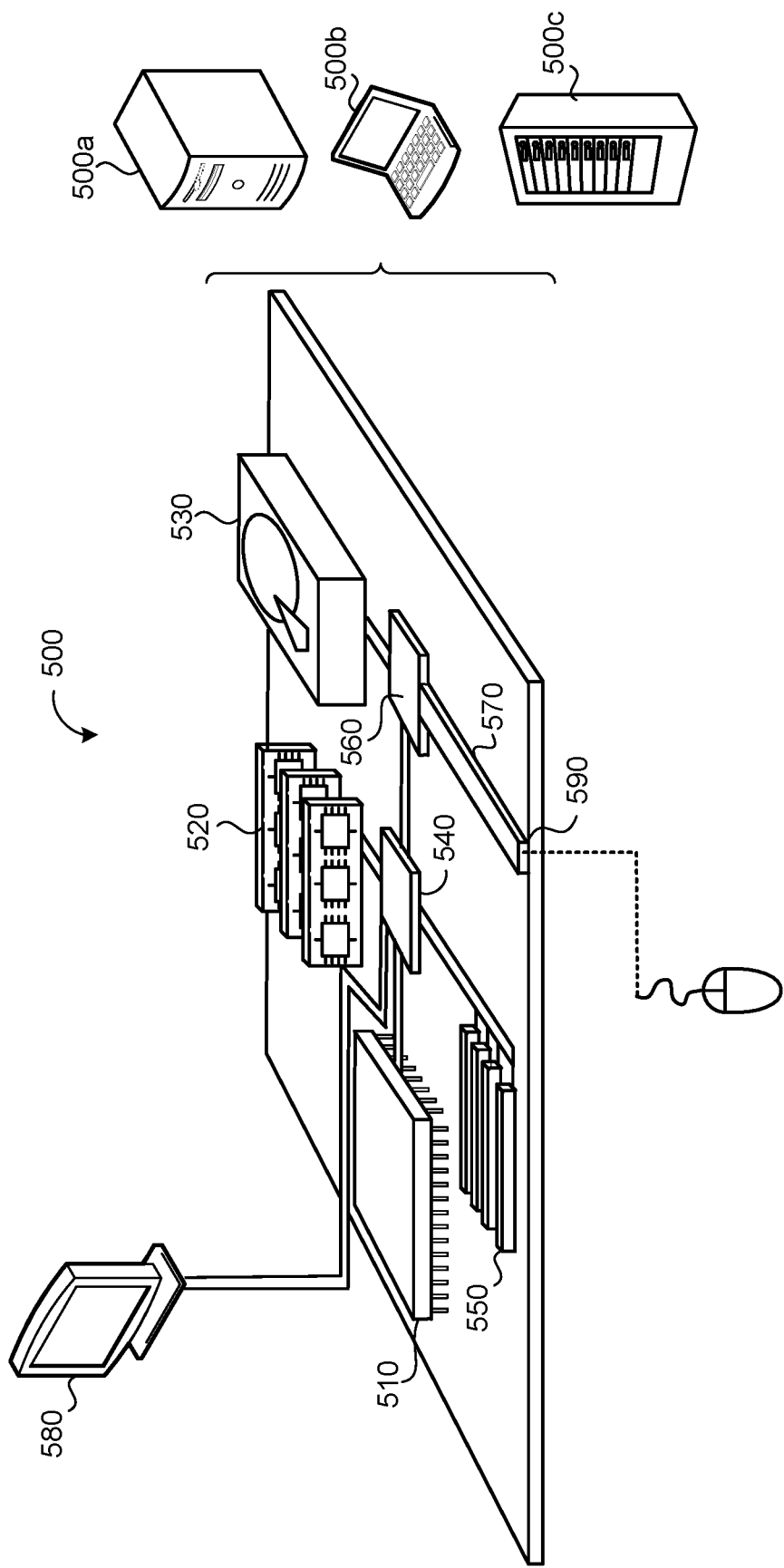
FIG. 5 is a schematic view of an example computing device that may be used to implement the systems and methods described herein.

FIG. 5 is schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510, memory 520, a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed by data processing hardware that causes the data processing hardware to perform operations comprising:
    obtaining sample utterances of synthesized speech in a target domain;
    obtaining transcribed utterances of non-synthetic speech in the target domain;
    pre-training a speech recognition model on the sample utterances of synthesized speech in the target domain to attain an initial state for warm-start training; and
    after pre-training the speech recognition model, warm-start training the speech recognition model on the transcribed utterances of non-synthetic speech in the target domain to teach the speech recognition model to learn to recognize real/human speech in the target domain.

2. The method of claim 1, wherein obtaining the sample utterances of synthesized speech in the target domain comprises generating, using a text-to-speech (TTS) system, each sample utterance of synthesized speech based on a corresponding transcript of the sample utterance received as input at the TTS system.

3. The method of claim 2, wherein the corresponding transcript is sampled from a language model.

4. The method of claim 2, wherein the TTS system is trained on transcribed audio samples in the target domain.

5. The method of claim 2, wherein the TTS system is trained on out-of-domain audio samples distinct from the target domain.

6. The method of claim 2, wherein the TTS system is configured to vary voice characteristics across the sample utterances of synthesized speech.

7. The method of claim 2, wherein the TTS system is configured to vary prosodic/style qualities across the sample utterances of synthesized speech.

8. The method of claim 1, wherein the operations further comprise applying data augmentation to one or more of the sample utterances of synthesized speech.

9. The method of claim 8, wherein the applied data augmentation comprises at least one of adding noise, adding reverberation, or manipulating timing.

10. The method of claim 1, wherein the speech recognition model comprises a frame-alignment-based transducer model.

11. The method of claim 10, wherein the frame-alignment-based transducer model comprises a Recurrent Neural Network-Transducer (RNN-T) model.

12. The method of claim 1, wherein the speech recognition model comprises an alignment-based encoder-decoder model.

13. A system comprising:
    data processing hardware; and
    memory hardware in communication with the data processing hardware, the memory hardware storing instructions that when executed on the data processing hardware cause the data processing hardware to perform operations comprising:
        obtaining sample utterances of synthesized speech in a target domain;
        obtaining transcribed utterances of non-synthetic speech in the target domain;
        pre-training a speech recognition model on the sample utterances of synthesized speech in the target domain to attain an initial state for warm-start training; and
        after pre-training the speech recognition model, warm-start training the speech recognition model on the transcribed utterances of non-synthetic speech in the target domain to teach the speech recognition model to learn to recognize real/human speech in the target domain.

14. The system of claim 13, wherein obtaining the sample utterances of synthesized speech in the target domain comprises generating, using a text-to-speech (TTS) system, each sample utterance of synthesized speech based on a corresponding transcript of the sample utterance received as input at the TTS system.

15. The system of claim 14, wherein the corresponding transcript is sampled from a language model.

16. The system of claim 14, wherein the TTS system is trained on transcribed audio samples in the target domain.

17. The system of claim 14, wherein the TTS system is trained on out-of-domain audio samples distinct from the target domain.

18. The system of claim 14, wherein the TTS system is configured to vary voice characteristics across the sample utterances of synthesized speech.

19. The system of claim 14, wherein the TTS system is configured to vary prosodic/style qualities across the sample utterances of synthesized speech.

20. The system of claim 13, wherein the operations further comprise applying data augmentation to one or more of the sample utterances of synthesized speech.

21. The system of claim 20, wherein the applied data augmentation comprises at least one of adding noise, adding reverberation, or manipulating timing.

22. The system of claim 13, wherein the speech recognition model comprises a frame-alignment-based transducer model.

23. The system of claim 22, wherein the frame-alignment-based transducer model comprises a Recurrent Neural Network-Transducer (RNN-T) model.

24. The system of claim 13, wherein the speech recognition model comprises an alignment-based encoder-decoder model.

* * * * *